Aug. 21, 1928.

L. RAAB 1,681,885

MOTOR VEHICLE

Filed June 17, 1926    2 Sheets-Sheet 1

Inventor:
Leopold Raab

Aug. 21, 1928. 1,681,885
L. RAAB
MOTOR VEHICLE
Filed June 17, 1926   2 Sheets-Sheet 2

Inventor:
Leopold Raab

Patented Aug. 21, 1928.

1,681,885

UNITED STATES PATENT OFFICE.

LEOPOLD RAAB, OF VIENNA, AUSTRIA, ASSIGNOR TO OESTERREICHISCHE DAIMLER-MOTOREN AKTIENGESELLSCHAFT, OF WIENER-NEUSTADT, AUSTRIA.

MOTOR VEHICLE.

Application filed June 17, 1926, Serial No. 116,758, and in Austria June 24, 1925.

This invention relates to a motor-vehicle of the kind wherein the spring support for the body of the vehicle is obtained by means of the wheel axles each of which is divided into parts which are hingedly connected so that they can be relatively deflected in a vertical plane, the parts being controlled by springs which maintain the hinges and the body of the car normally in the highest position relative to the wheels.

The object of the invention is in the first place to reduce to a minimum the variations in the distance between the wheel treads which occur under the springing of the axles, and the invention consists in this respect in arranging the hinges so that the axle parts can oscillate about a point situated below the level of the road wheel centers.

A further object of the invention is to protect the springs from atmospheric influences, and in this respect the invention consists in enclosing the springs in casings which also cooperate with flaps controlled by the axle parts so as to form pneumatic shock absorbers.

Figure 1:
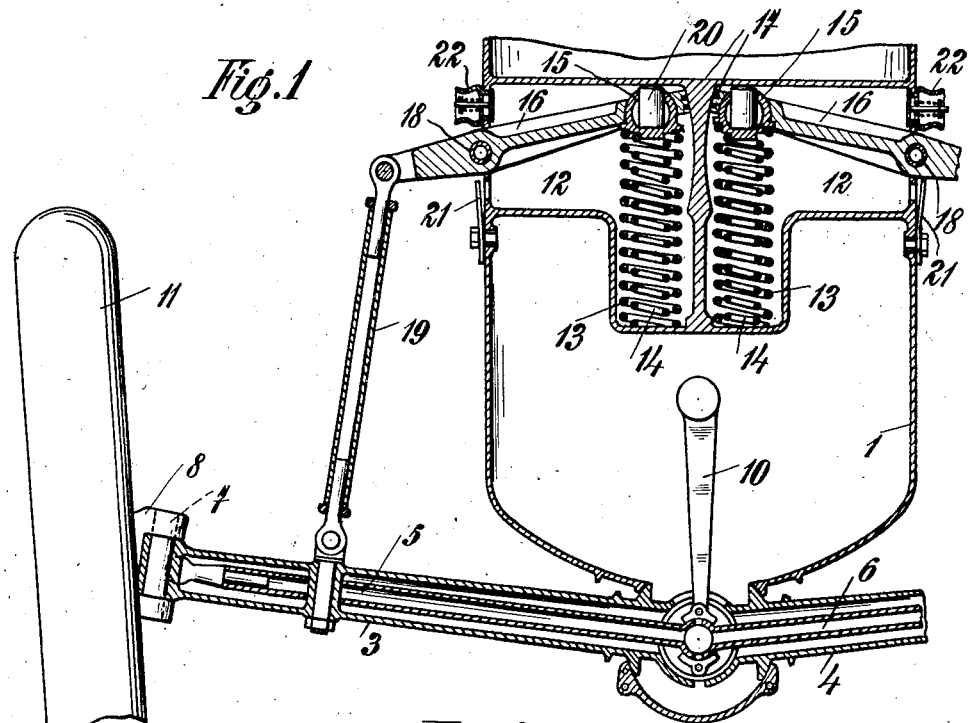
Figure 2:
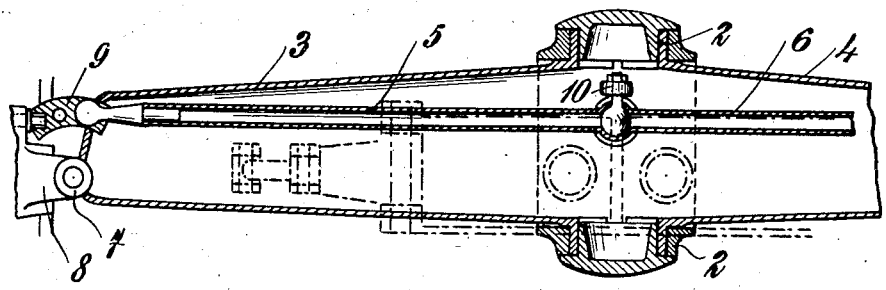
Figure 3:
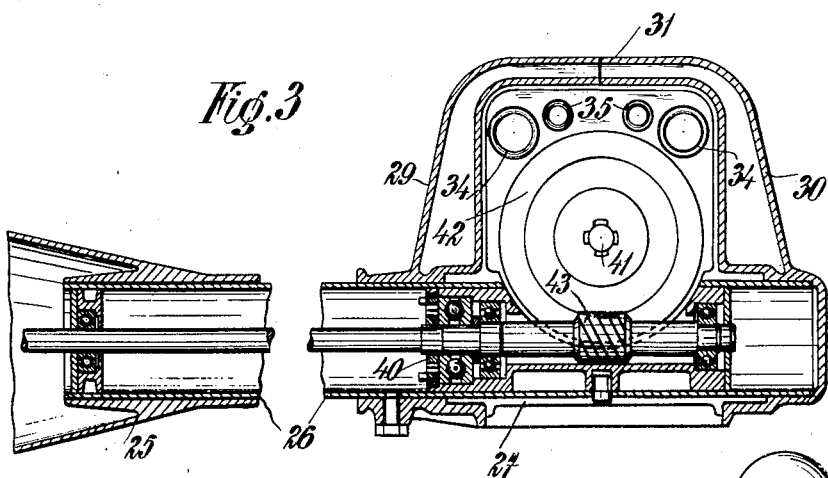
Figure 4:
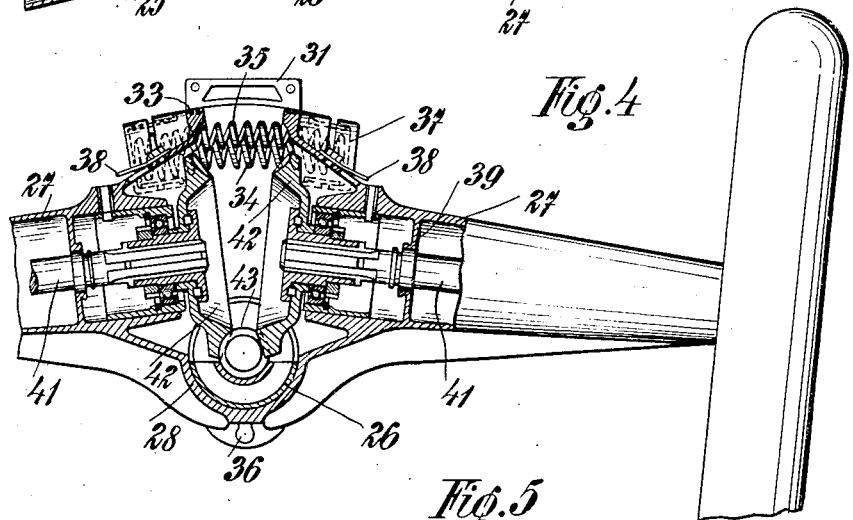
Figure 5:
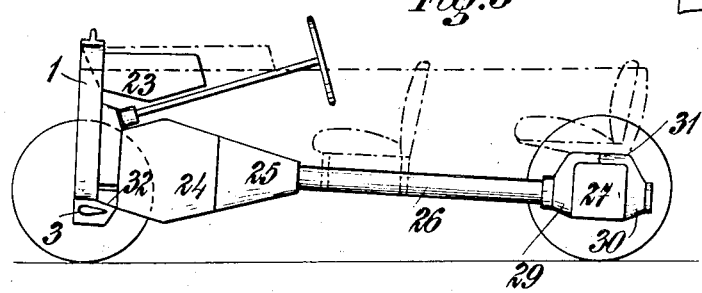

Fig. 1 of the accompanying drawings represents a vertical section along the front axle, Fig. 2, a horizontal section along the same, Fig. 3, a vertical section along the hinge of the rear axle, Fig. 4, a section across the latter hinge, and Fig. 5, a diagrammatic side view of the car.

The wheel axles of the motor-vehicle are divided into parts which are hingedly connected so that they can be deflected in a vertical plane and support the body of the car resiliently, the axle parts being spring-controlled for the purpose.

The front axle is shown in Figs. 1 and 2. It consists of two tubular parts 3 and 4 of pear-shaped cross-section which are adjustable in a vertical plane about hinge-elements 2 and which support by means of said hinge-elements a flat, substantially upright casing 1. The bearing surfaces of the hinge-elements are sufficiently distanced to prevent horizontal relative deflection without struts and braces. The road wheels 11 are swivelled in the usual manner to the outer ends of the axle parts and the latter are inclined so that the hinge will be situated below the level of the wheel centers. By this arrangement the variations in the distance between the wheel treads under the springing of the axle, will be reduced to a minimum. For convenience in the construction, the pins 7 about which the wheels swivel, are arranged at right angles to the respective axle parts, the forks 8 being modified so as to maintain the wheels at the usual angle relative to the road. The resiliency of the axle is obtained from two flaps 16 which are pivoted as double-armed levers to the casing 1 at 18 and which are connected by rods 19 to the axle parts so as to be controlled by the latter. The free ends of the flaps are supported by springs 13 and 14 which thus maintain the hinge normally in its highest position relative to the road wheels and yield so as to allow the axle parts to be deflected under load. The springs together with the adjacent parts of the flaps are housed in chambers 12 in the casing 1. The springs bear against spherical shells 15 which are rotatably held in the flaps and which are fitted with rubber or spring buffers 20 which take the thrust of the flaps against the top of the chambers. The flaps are fitted with packing strips 17 whereby they form a tight closure with the chamber walls relative to which they are displaced and divide each chamber into two airtight compartments. A valve 22 admits air into the upper compartment when the flap is depressed while a valve 18 allows the air in the opposite chamber to escape. As the flap springs back, the valves close, and the air-trap thus formed opposes the return movement of the flap. Thus a pneumatic shock absorber is formed. Sufficient leakage is provided to enable the elements to return gradually to their normal position. This may be effected by means of adjustable air vents. Means may also be provided for regulating the spring pressure.

The steering is effected by means of rods 5 and 6 which are enclosed within the axle parts and connected by a ball joint which remains substantially coaxial with the hinge 2, so that the rods can be deflected together with the axle parts without affecting the steering. The rods are operated by means of a lever 10 which acts on the ball joint. The outer ends of the rods are connected by ball joints to segments 9 connected to the wheel 11 for the control of the latter.

In the case of a water-cooled motor, the casing 1 may be adapted to carry the radiator. Tools and the like may be stored in a compartment in the upper part of the casing which also carries the fuel receptacle 23 (Fig. 5). The motor casing 24 is secured to the casing 1 and carries in its turn the gear casing 25. The latter tapers towards the rear and is continued by a tubular body 26 which takes the place of the usual under-carriage frame. Secured to the rear end of the body 26 is a U-shaped casing composed of two parts 29 and 30 between which the ends of the rear axle parts 27 are accommodated. These parts are formed with shells 28 whereby they are mounted on the body 26 so that they can be deflected about the latter, while the flap-like ends of the parts themselves move within the casing 29, 30 and form together with the latter a substantially airtight chamber, the axle parts being for this purpose provided with packing strips 33. Also in this case the arrangement is such that the hinge becomes situated below the level of the road wheel centers. Springs 34 and 35, arranged between the flaps, keep the free ends of the latter normally apart and ensure the resiliency of the axle. Screw-caps 37 which enclose the ends of the springs and take the thrust, can be adjusted for regulating the spring pressure. Valves 38 allow the air to escape from the chamber when the springs are compressed and prevent a quick readmission of the same so that the return movement will be checked and the shocks absorbed. Adjustable air vents may also be provided for regulating the air admission. The deflection of the axle parts is limited in one direction by the abutment of the shells 28 against each other. The joint between the shells is protected by means of a leather strip 36 which is wide enough to allow the edges of the shells to move apart. The road wheels are connected to shafts 41 which are brought up through the hollow axle parts. Partitions 39 through which the shafts pass, form closures for the air chamber. The inner ends of the shafts are supported by ball-bearings and fitted with worm wheels 42 whereby motion is transmitted to the road wheels. Both worm wheels are operated by a single worm 43 which is concentric with the hinge about which the axle parts are deflected. The driving shaft on which the worm is mounted is coupled to the motor and accommodated in the tubular body 26. A ring 40 behind the bearing in the body 26 forms a closure for the air chamber.

The top surface 31 of the casing 29, 30 serves as a support for the carriage body at the rear end of the car, the front part of the body being supported on flanges 32 on the casing 1.

The axle parts may be stamped out of sheet metal and the seams welded. A separate hinge for each part may be provided if desired.

The vehicle construction is suitable for small cars and presents a considerable simplification of the usual construction employed for small cars.

I claim:

1. In a motor-vehicle the combination with an axle divided into two spring-controlled parts adapted to be relatively deflected about a point situated below the level of the wheel centres, of a propeller shaft arranged with its axis in alignment with the point about which the axle parts are deflected.

2. In a motor-vehicle, the combination with an axle divided into two spring-controlled parts adapted to be relatively deflected, of a propeller shaft carried below the axle parts and below the level of the wheel centres, means for supporting the axle parts so that their deflecting movements will be concentric with the propeller shaft, and a gearing adapted to transmit motion from the propeller shaft to the axle parts.

3. A motor vehicle having an axle divided into two spring-controlled parts adapted to be relatively deflected about a point situated below the level of the wheel center, a driving shaft, a worm on said shaft, and worm wheels connected to said axle parts and meshing with the worm.

4. The structure claimed in claim 3 wherein the axle parts are normally inclined downwards towards the wheels.

5. In a motor vehicle having axles divided into two spring-controlled parts adapted to be relatively deflected in a vertical plane, bearing shells holding said axle parts at the point below the level of the wheel centers, the axle parts being widened towards the bearing shells, said bearing shells and the adjacent portions of the axle parts being wide enough to prevent deflection of the parts in a horizontal plane.

6. In a motor vehicle having axles divided into two spring-controlled parts adapted to be relatively deflected in a vertical plane, a casing enclosing the controlling springs for the axle parts, and pneumatic shock-absorbing means contained in said casing, said axle parts being arranged so that the center of deflection is situated below the level of the wheel centers.

7. The structure claimed in claim 6 and a linkage whereby the axle parts are connected to the shock-absorbing means.

8. The structure claimed in claim 1 including flaps controlled by the axle parts and taking the thrust of the springs, casings enclosing the flaps and the springs and cooperating with the flaps so as to form pneumatic shock-absorbers, and valves in said casing adapted to admit air in one direction and oppose the air in the other direction.

9. The structure claimed in claim 1 and a casing enclosing the adjacent ends of the axle parts, flaps controlled by the axle parts and taking the thrust of the springs, said flaps forming an hermetic closure with said casing so as to act as pneumatic shock absorbers, the casing having air vents, and valves in said vents controlling the admission and discharge of the air.

LEOPOLD RAAB.